(12) United States Patent
Yukami

(10) Patent No.: US 11,633,987 B2
(45) Date of Patent: Apr. 25, 2023

(54) TIRE

(71) Applicant: Sumitomo Rubber Industries, Ltd., Hyogo (JP)

(72) Inventor: Shinsuke Yukami, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 175 days.

(21) Appl. No.: 17/084,753

(22) Filed: Oct. 30, 2020

(65) Prior Publication Data

US 2021/0155054 A1    May 27, 2021

(30) Foreign Application Priority Data

Nov. 25, 2019    (JP) .............................. JP2019-212401

(51) Int. Cl.
*B60C 11/03* (2006.01)
*B60C 11/13* (2006.01)
*B60C 11/12* (2006.01)

(52) U.S. Cl.
CPC .......... *B60C 11/0306* (2013.01); *B60C 11/12* (2013.01); *B60C 11/1369* (2013.01); *B60C 2011/0346* (2013.01); *B60C 2011/133* (2013.01); *B60C 2011/1361* (2013.01)

(58) Field of Classification Search
CPC ............ B60C 11/1307; B60C 11/1392; B60C 2011/133; B60C 2011/1361; B60C 11/1338; B60C 11/0309; B60C 11/0316
See application file for complete search history.

(56) References Cited

U.S. PATENT DOCUMENTS

2007/0240801 A1\* 10/2007 Tanaka ................... B60C 11/13
152/209.21
2009/0320982 A1    12/2009 Ochi

FOREIGN PATENT DOCUMENTS

JP               4738276 B2    8/2011

\* cited by examiner

*Primary Examiner* — Robert C Dye
*Assistant Examiner* — Nicholas J Weiler
(74) *Attorney, Agent, or Firm* — Studebaker & Brackett PC

(57) ABSTRACT

A tire includes a tread portion including a circumferential groove and a land portion defined by the circumferential groove, the land portion including a land sidewall facing the circumferential groove. The land sidewall includes a first surface, a second surface located on a groove centerline side of the circumferential groove with respect to the first surface, and a stair portion formed between the first surface and the second surface. The stair portion varies its radial height stepwise in two or more steps in a longitudinal direction of the circumferential groove.

15 Claims, 9 Drawing Sheets

TIRE

BACKGROUND ART

Field of the Disclosure

The present disclosure related to a tire.

Description of the Related Art

The following Patent document 1 discloses a pneumatic tire including a tread portion provided with a plurality of blocks. The plurality of blocks has notch cuts on edge portions thereof, and each notch cut has an inclined surface in a stairstep shape extending toward a groove bottom from a respective brock top surface.

PATENT DOCUMENT

[Patent document 1] Japanese Patent 4738276

SUMMARY OF THE DISCLOSURE

Unfortunately, the pneumatic tire disclosed in Patent document 1 has room for consideration to improve driving performance on snow.

The present invention has been made in view of the above circumstances and has an object to improve driving performance on snow.

In one aspect of the disclosure, a tire includes a tread portion including a circumferential groove and a land portion defined by the circumferential groove, the land portion including a land sidewall facing the circumferential groove, the land sidewall including a first surface, a second surface located on a groove centerline side of the circumferential groove with respect to the first surface, and a stair portion formed between the first surface and the second surface, wherein the stair portion varies its radial height stepwise in two or more steps in a longitudinal direction of the circumferential groove.

In another aspect of the disclosure, the land portion may include a plurality of circumferentially arranged blocks divided by lateral grooves, and the stair portion may be provided on at least one of the plurality of blocks.

In another aspect of the disclosure, the stair portion may be provided on at least two of the plurality of blocks.

In another aspect of the disclosure, the stair portion may be provided on a pair of circumferentially adjacent blocks of the plurality of blocks.

In another aspect of the disclosure, the stair portion may be provided so as to descend toward the lateral grooves.

In another aspect of the disclosure, the stair portion may communicate with one of the lateral grooves.

In another aspect of the disclosure, the at least one of the plurality of blocks provided with the stair portion may include a corner portion formed between the circumferential groove and one of the lateral grooves, and the corner portion may be provided with a recess formed by the first surface, the second surface and the stair portion.

In another aspect of the disclosure, a length of the stair portion may be equal to or less than 80% of a length in a tire circumferential direction of the at least one of the plurality of blocks.

In another aspect of the disclosure, a width of the stair portion may be equal to or less than 30% of a width in a tire axial direction of the at least one of the plurality of blocks.

In another aspect of the disclosure, the stair portion may vary its radial height stepwise in three or more steps in the longitudinal direction of the circumferential groove.

In another aspect of the disclosure, a tire includes a tread portion including a lateral groove and a land portion defined by the lateral groove, the land portion including a land sidewall facing the lateral groove, the land sidewall including a first surface, a second surface located on a groove centerline side of the lateral groove with respect to the first surface, and a stair portion formed between the first surface and the second surface, wherein the stair portion varies its radial height stepwise in two or more steps in a longitudinal direction of the lateral groove.

DESCRIPTION OF THE PREFERRED EMBODIMENTS

Figure 1:
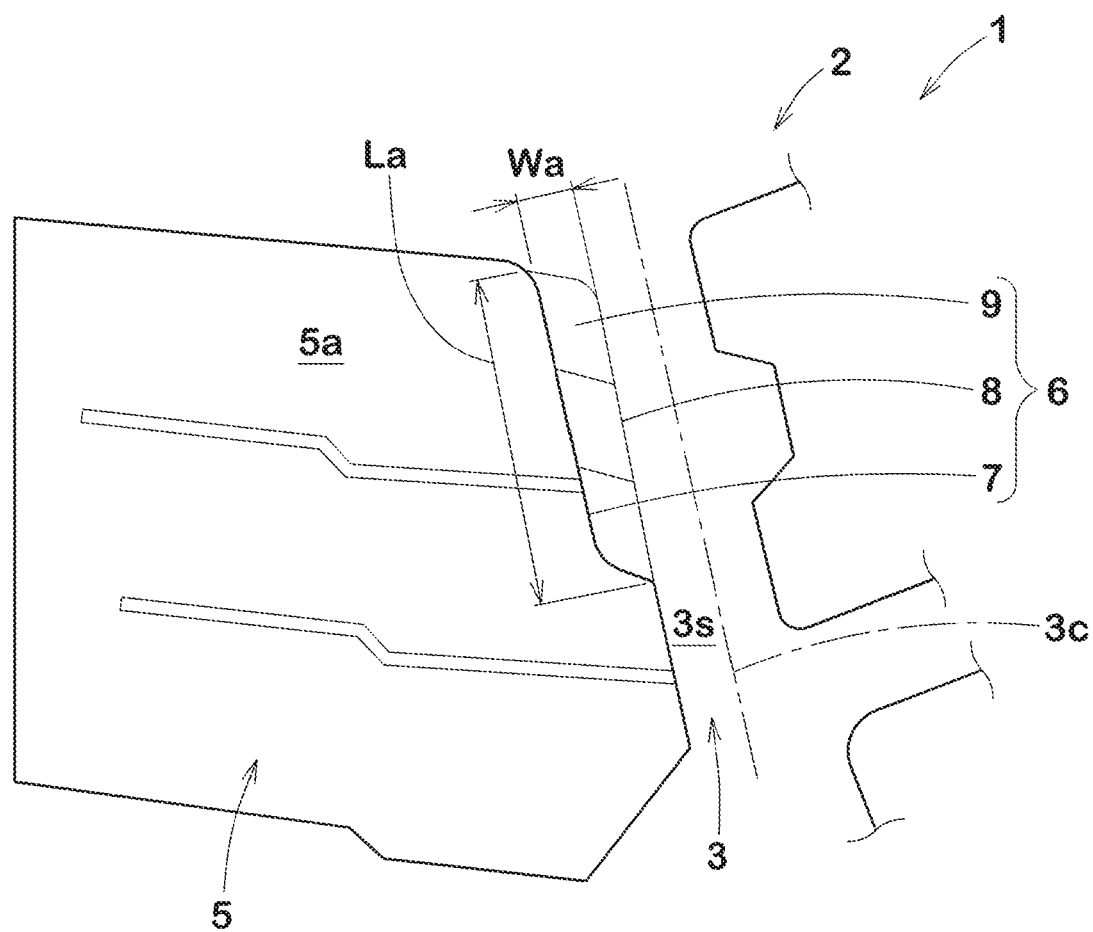
FIG. 1 is an enlarged plan view of a tread portion according to an embodiment of the present disclosure.

An embodiment of the present disclosure will be explained below with reference to the accompanying drawings.

Note that the same elements or parts are denoted by the same reference numerals throughout the embodiments below, and that redundant description of already described elements is omitted.

FIG. 1 is an enlarged plan view of a tread portion 2 of a tire 1 according to an embodiment of the present disclosure. The tire 1 according to the present embodiment, for example, is used suitably as a winter tire. As used herein, the above-mentioned winter tire shall mean tires that are suitable for driving on snow, e.g., a studless tire, a snow tire, an all-season tire and the like.

In the present embodiment, the tread portion 2 includes at least one circumferential groove 3 and at least one land portion 5 defined by the circumferential groove 3. As used herein, the circumferential groove 3 may be a groove that relatively extends in the tire circumferential direction along the land portion 5, and includes, for example, one that extends in a straight shape, a zigzag shape, or an arc shape. Further, as used herein, the groove is a groove having a width orthogonal to its longitudinal direction of 1.5 mm or more.

Figure 2:
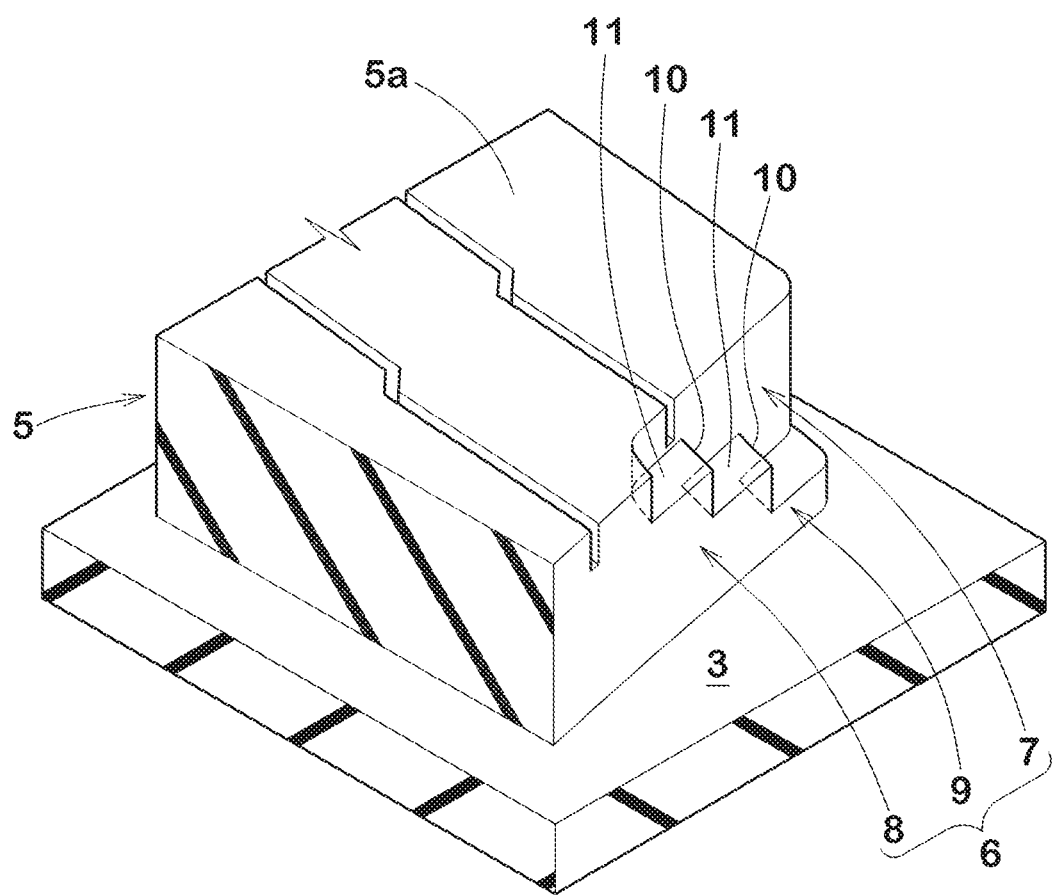
FIG. 2 is a partial perspective view of a land portion of FIG. 1.

FIG. 2 is a partial perspective view of the land portion 5 of FIG. 1. As illustrated in FIG. 1 and FIG. 2, the land portion 5 according to the present embodiment includes a land sidewall 6 facing the circumferential groove 3.

The land sidewall 6, in the present embodiment, includes a first surface 7, a second surface 8 located on a groove centerline 3c side of the circumferential groove 3 with respect to the first surface 7, and a stair portion 9 formed between the first surface 7 and the second surface 8. The stair portion 9 varies its radial height stepwise in two or more steps in the longitudinal direction of the circumferential groove 3. Such a stair portion 9 can generate powerful traction in the longitudinal direction of the circumferential groove 3 when traveling on snowy roads. Thus, the tire 1 according to the present embodiment has excellent driving performance on snow.

The first surface 7, for example, extends inwardly in the tire radial direction from a ground contact surface 5a of the land portion 5. The second surface 8, in the present embodiment, is formed as a land sidewall surface that is closest to the groove centerline 3c side of the circumferential groove 3. The second surface 8, for example, extends inwardly in the tire radial direction from the ground contact surface 5a to a bottom surface 3s of the circumferential groove 3.

The stair portion 9, in the present embodiment, includes a plurality of riser elements 10 extending in the tire radial direction and a plurality of step elements 11 extending between the riser elements 10. The plurality of step elements 11, for example, extends in parallel with the ground contact surface 5a of the land portion 5. The riser elements 10 and the step elements 11 are alternated in the longitudinal direction of the circumferential groove 3. The plurality of riser elements 10, in the present embodiment, can generate snow-shearing force. The step elements 11 can compress snow to form firm snow columns. Note that the plurality of step elements 11 is not limited to those extending in parallel with the ground contact surface 5a as long as they can exert such effect.

The plurality of step elements 11, in a plan view of the tread portion 2, has a parallelogram shape. Such step elements 11 can maintain stiffness of the stair portion 9 high. Note that the step elements 11 are not limited to such an aspect, but can be a rectangular shape, for example.

In order to form a large snow column and improve driving performance on snow, it is desirable that the stair portion 9 has three or more steps in the longitudinal direction of the circumferential groove 3. Note that when the height change of the stair portion 9 becomes too large, stiffness of the land portion 5 may decrease and wear resistance thereof may deteriorate. Thus, it is preferable that the stair portion 9 has a height change of 4 steps or less.

The stair portion 9 has a length La that is a distance between both ends in the direction in which the height changes (in the present embodiment, the longitudinal direction of the circumferential groove 3). Further, the stair portion 9 has a width Wa that is a length (recess length) orthogonal to the longitudinal direction of the stair portion 9. In the present embodiment, the length La of the stair portion 9 is formed to be larger than the width Wa of the stair portion 9. The stair portion 9 according to the present embodiment can form a large snow column in the tire circumferential direction. Thus, powerful traction can be generated. Although not particularly limited, the length La of the stair portion 9 is preferably about 2 to 8 times, more preferably about 3 to 6 times the width Wa of the stair portion 9.

Figure 3:
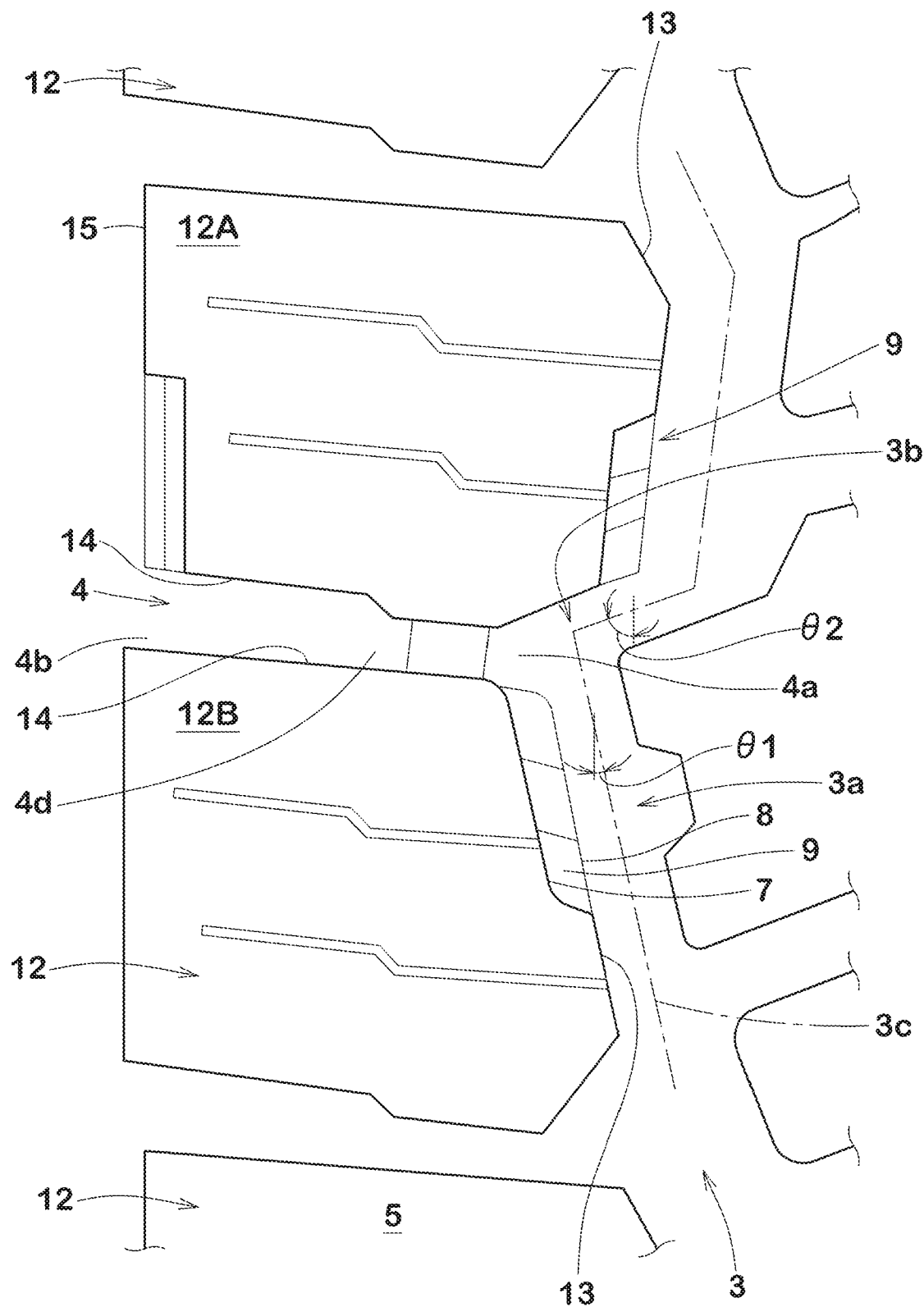
FIG. 3 is a plan view of the land portion.
Figure 4:
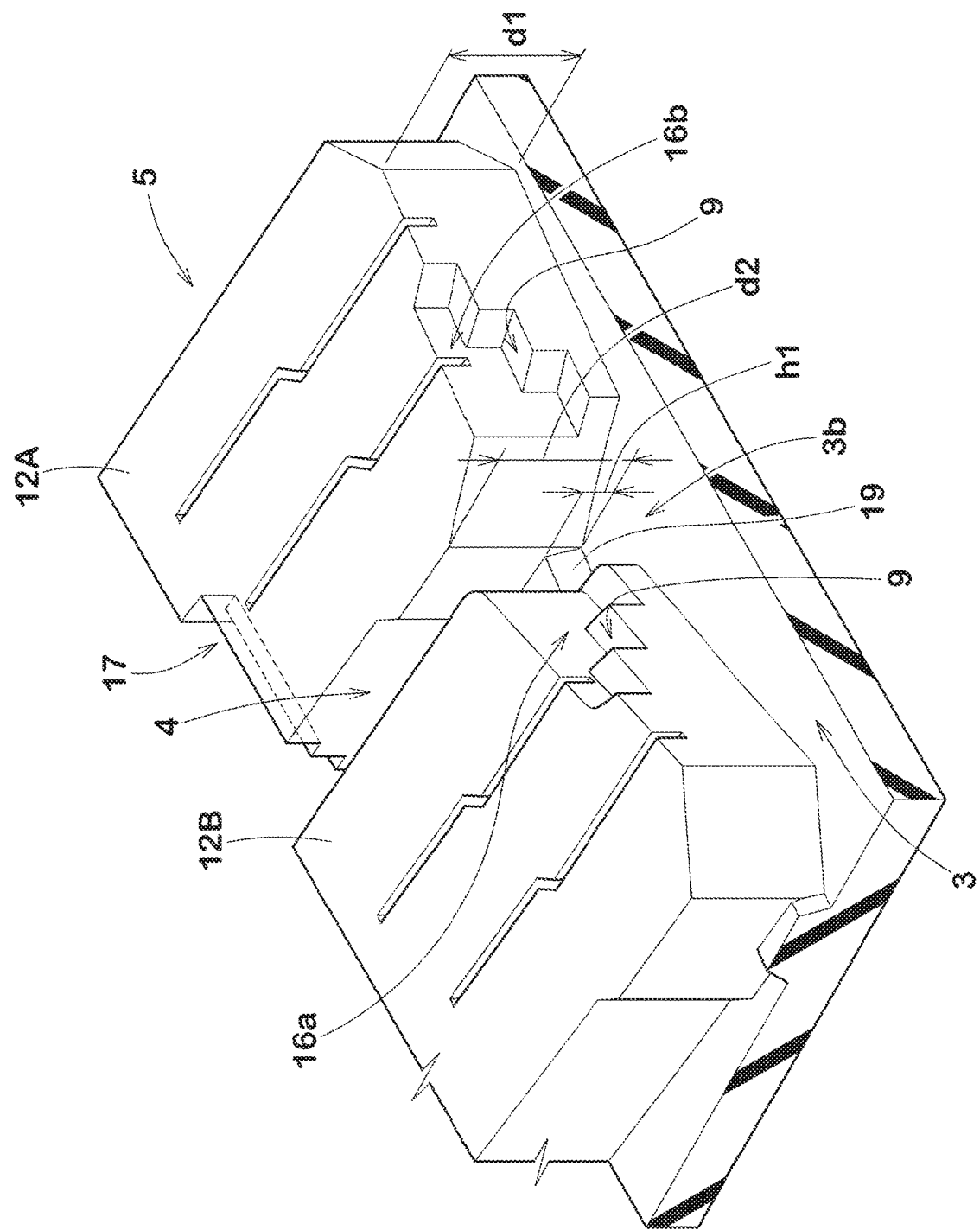
FIG. 4 is a perspective view of the land portion as viewed from a circumferential groove.

FIG. 3 is a plan view of the land portion 5, and FIG. 4 is a perspective view of the land portion 5 as viewed from the circumferential groove 3. As illustrated in FIG. 3 and FIG. 4, the circumferential groove 3, in the present embodiment, extends in a zigzag shape in the tire circumferential direction. The circumferential groove 3, for example, includes first inclined elements 3a inclined at an angle θ1 with respect to the tire circumferential direction and second inclined elements 3b inclined in an opposite direction to the first inclined elements 3a at an angle θ2 larger than that of the first inclined elements 3a. The first inclined elements 3a and the second inclined elements 3b are alternated in the tire circumferential direction. The second inclined elements 3b, in the present embodiment, have a length in the tire circumferential direction shorter than that of the first inclined elements 3a. In the present embodiment, the angle θ1 of first inclined elements 3a is in a range of 5 to 40 degrees with respect to the tire circumferential direction. In the present embodiment, the angle θ2 of the second inclined elements 3b is in a range of 45 to 85 degrees with respect to the tire circumferential direction. The angles θ1 and θ2 are angles measured using the groove centerlines 3c.

In the present embodiment, lateral grooves 4 that extend from the circumferential groove 3 are provided to divide the land portion 5. The lateral grooves 4, for example, traverse the land portion 5 completely in the tire axial direction. Thus, the land portion 5 according to the present embodiment is configured as a row of a plurality of blocks 12 arranged in the tire circumferential direction through the lateral grooves 4. Note that the lateral grooves 4 are not limited to such an aspect, but may terminate within the land portion 5, for example. As used herein, the lateral grooves 4 may be any groove that extends in the tire axial direction relatively across the land portion 5, and includes for example, straight, zigzag, or arc-shaped grooves.

The lateral grooves 4, for example, are communicated with the respective second inclined elements 3b. Thus, the lateral grooves 4 and the second inclined elements 3b form long snow columns that extend in the tire axial direction, resulting in generating powerful snow traction.

Each lateral groove 4, in the present embodiment, includes a narrow-width portion 4a connected to the circumferential groove 3 having a first groove width, and a wide-width portion 4b connected to the narrow-width portion 4a and having a second groove width greater than the first groove width. The narrow-width portion 4a, for example, decreases in groove width toward the opposite direction of the circumferential groove 3. The wide-width portion 4b, for example, increases in groove width toward the opposite direction of the circumferential groove 3. The wide-width portion 4b, in the present embodiment, includes a sudden change portion 4d in which the groove width changes drastically.

The plurality of blocks 12, in the present embodiment, includes one or more first blocks 12A arranged on a first side in the tire circumferential direction (upper side in FIG. 3) with respect to the respective lateral grooves 4, and one or more second blocks 12B arranged on a second side in the tire circumferential direction (lower side in FIG. 3) with respect to the respective lateral grooves 4. Thus, the land portion 5 includes a plurality pairs of first and second blocks 12A and 12B which are arranged adjacently in the tire circumferential direction through a respective one of the lateral grooves 4.

The stair portion 9 may be provided on at least one of the blocks 12. In order to further improve driving performance on snow, the stair portion 9 may preferably be provided on at least two of the blocks 12. In the present embodiment, the stair portion 9 is provided on the plurality pairs of first and second blocks 12A and 12B.

As the land sidewall, each of the first block 12A and the second block 12B, for example, includes a first circumferential land sidewall 13 facing the circumferential groove 3, and a lateral land sidewall 14 facing the one of the lateral grooves 4. Further, each first block 12A, in the present embodiment, includes a second circumferential land sidewall 15 located on the axially opposite side to the first circumferential land sidewall 13 and extending in the tire circumferential direction from its lateral land sidewall 14.

Figure 5:
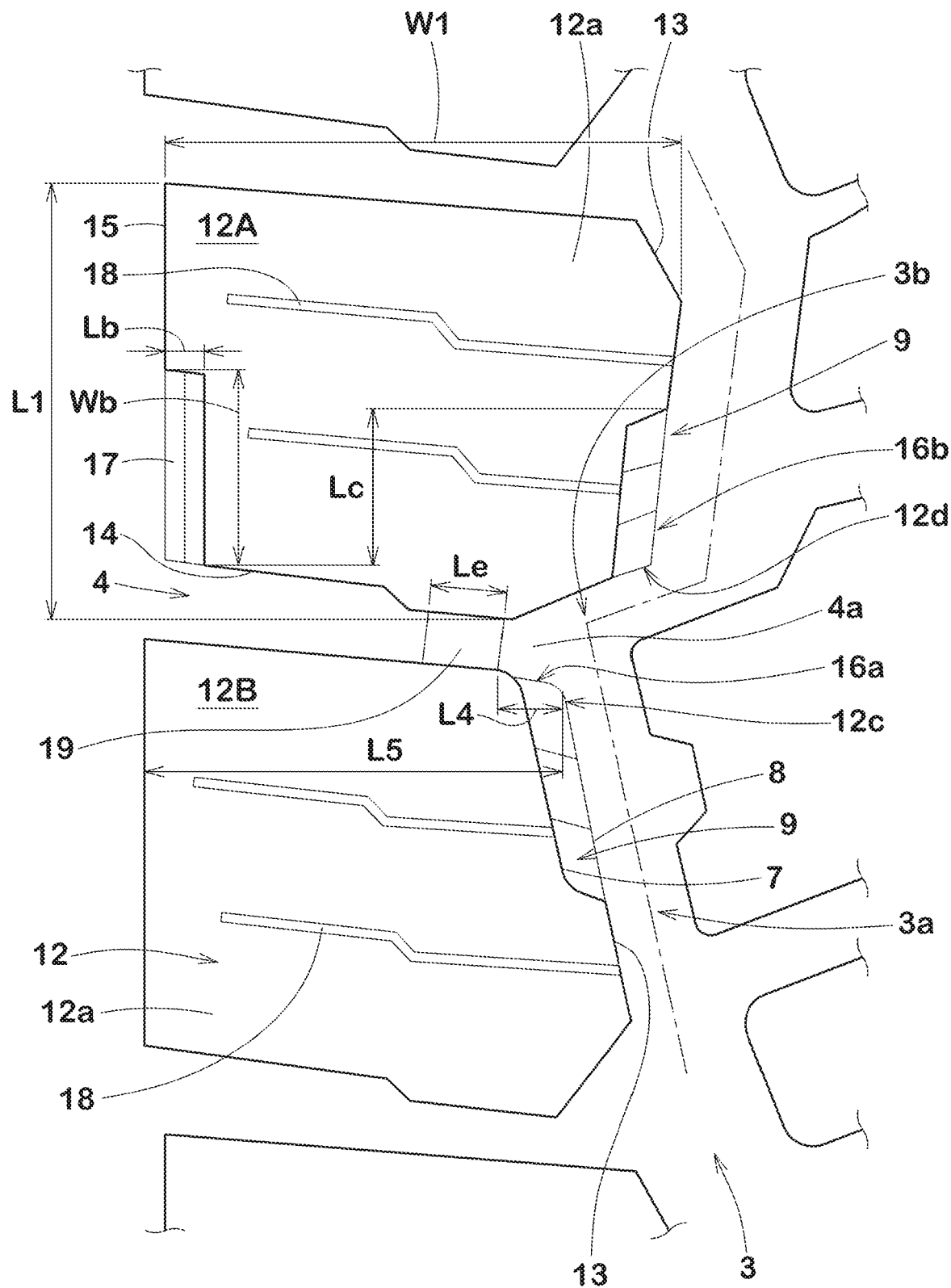
FIG. 5 is a plan view of the land portion.

FIG. 5 is a plan view of the land portion 5. As illustrated in FIG. 4 and FIG. 5, one or more stair portions 9, for example, communicate with the lateral groove 4. In the present embodiment, each stair portion 9 provided on the second blocks 12B communicate with a respective one of the lateral grooves 4. Each stair portion 9 provided on the first blocks 12A communicate with a respective one of the second inclined elements 3b. Thus, the circumferential adjacent stair portions 9 of the first block 12A and the second block 12B can form a circumferentially long snow column through one of the lateral grooves 4 and one of the second inclined elements 3b, resulting in generating powerful snow traction.

It is preferable that some of the stair portions 9, for example, are provided so as to descend toward the lateral grooves 4. In the present embodiment, each stair portion 9 of the second blocks 12B descends toward the lateral groove 4 adjacent thereto. Further, each stair portion 9 of the first blocks 12A, through the second inclined element 3b, descends toward the lateral groove 4 adjacent thereto. Thus, a snow column compressed by the circumferentially adjacent stair portions 9 has a radial height that gradually increases toward the lateral groove 4. Such a snow column can be useful to generate greater snow traction.

Each block 12 according to the present embodiment has a corner portion 12c where the circumferential groove 3 and one of the lateral grooves 4 intersect. The corner portion 12c is provided with a recess 16a formed by the first surface 7, the second surface 8 and the stair portion 9. Such a recess 16a can offer sufficient volume of the circumferential groove 3 so that a snow compressed by the stair portion 9 can be discharged smoothly toward the circumferential groove 3. In the present embodiment, each second block 12B is provided with the recess 16a. Each first block 12A includes a corner portion 12d where one of the first inclined elements 3a and one of the second inclined elements 3b intersect, and the corner portion 12d is provided with a recess 16b formed by the first surface 7, the second surface 8 and the stair portion 9. Such a recess 16b can also offer sufficient volume of the circumferential groove 3 so that a snow compressed by the stair portion 9 can be discharged smoothly toward the circumferential groove 3.

Preferably, a length La (shown in FIG. 1) of each stair portion 9 is equal to or more than 80% of a length L1 in the tire circumferential direction of the block 12. Such a stair portion 9 can suppress a large reduction in stiffness of the block 12 and can prevent deterioration of wear resistance of the block 12. When the length La of the stair portion 9 becomes too small, it may not be possible to increase driving performance on snow. Thus, it is preferable that the length La of the stair portion 9 is equal to or more than 30% of the length L1 of the block 12. As used herein, the length L1 of the block 12 is measured as a circumferential distance between circumferential outermost ends of the block 12.

In order to improve the above effects, a width Wa of each stair portion 9 (shown in FIG. 1) is preferably equal to or less than 30% of a width W1 in the tire axial direction of the block 12. Further, the width Wa of each stair portion 9 is preferably equal to or more than 5% of the width W1 in the tire axial direction of the block 12. As used herein, the width W1 of the block 12 is measured as an axial length of the block between axially outermost ends of the block 12.

As used herein, unless otherwise noted, dimensions of respective portions of the tire 1 are values measured under a normal condition of the tire 1. As used herein, the "normal condition" is such that the tire 1 is mounted onto a standard wheel rim (not illustrated) with a standard pressure but loaded with no tire load.

The "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

The "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

Figure 6:
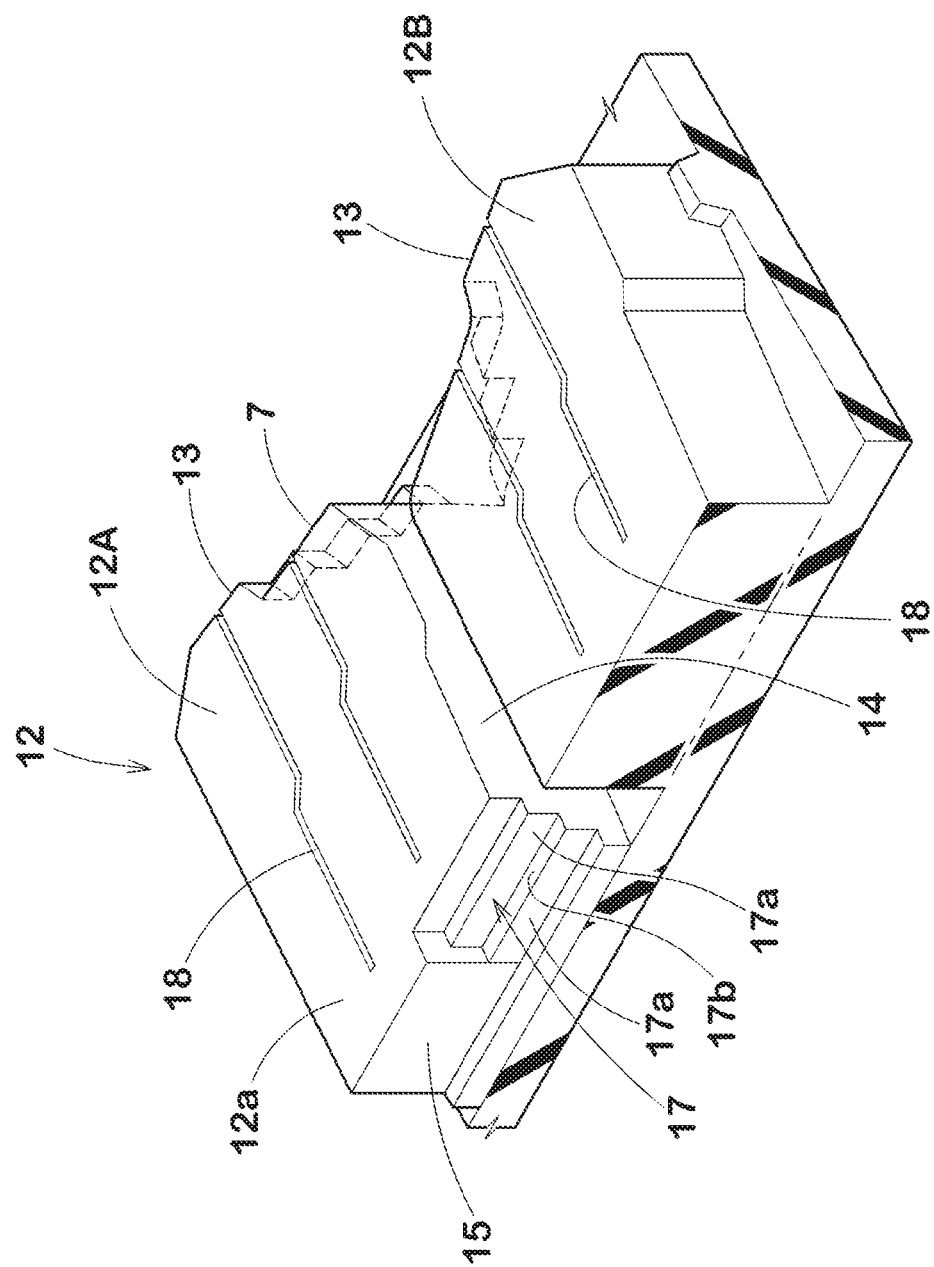
FIG. 6 is a perspective view of blocks as viewed from a second land sidewall.

FIG. 6 is a perspective view of two blocks 12 as viewed from the second circumferential land sidewalls 15. As illustrated in FIG. 5 and FIG. 6, at least one of the blocks 12 is further provided with a recess 17. The recess 17, in the present embodiment, is provided on each first block 12A. The recess 17, for example, is formed so as to cut out a part of a ground contact surface 12a of the block 12 and a part of the second circumferential land sidewall 15. The recess 17 according to the present embodiment is configured as a stair portion that descends in steps toward the opposite direction to the circumferential groove 3. Thus, a height of a snow column formed by the recess 17 varies along a longitudinal direction of the lateral groove 4.

The recess 17, for example, communicates with the lateral land sidewall 14. Such a recess 17 can discharge the snow column formed by the recess 17 toward the lateral grooves 4, resulting in improving driving performance on snow.

The recess 17, in the tire radial direction, includes a plurality of riser elements 17a extending in the tire radial direction and a plurality of step elements 17b extending between the riser elements 17a. The recess 17 is configured such that a length Lb thereof is shorter than a width Wb thereof. The length Lb of the recess 17 is a length in a direction that the height varies (i.e., in the present embodiment, the longitudinal direction of the lateral groove 4). The width Wb of the recess 17 is a length orthogonal to the length Lb. The length Lb of the recess 17 is preferably in a range of 0.15 to 0.35 times the width Wb, for example.

The recess 17, in the present embodiment, is located so as to overlap the stair portion 9 in the tire circumferential direction. Thus, since the recess 17 and the stair portion 9 form a snow column at the same time, powerful traction can be obtained when driving on snow. Although not particularly limited, a length Lc in which the recess 17 and the stair portion 9 overlap in the tire circumferential direction is preferably equal to or more than 50%, more preferably equal to or more than 80% of the width Wb of the recess 17.

Although not particularly limited, the width Wb of the recess 17 is preferably in a range of 40% to 60% of the length L in the tire circumferential direction of the block 12. The length Lb of the recess 17 is preferably in a range of 5% to 30% of the width W1 in the tire axial direction of the block 12.

The blocks 12, in the present embodiment, are provided with sipes 18. The sipes 18 can facilitate deformation of the blocks 12 and effectively discharge the remaining snow in the stair portions 9 and the recesses 17 to enhance driving performance on snow. The sipes 18, for example, are provided on the first blocks 12A and the second blocks 12B.

Note that "sipe" means a narrow cut that has a width of less than 1.5 mm measured orthogonal to its longitudinal direction.

The sipes 18, for example, extend in the tire axial direction. In the present embodiment, a plurality of sipes, two sipes 18 spaced in the tire circumferential direction in this embodiment, is provided on each block 12, for example. The sipes 18, in the present embodiment, extend without intersecting from one another. Preferably, the sipes 18 provided on each block 12 extend in parallel at least partially with one another.

In each block 12, the sipes 18 according to the present embodiment, extend from the first circumferential land sidewall 13 in the tire axial direction and terminate within the block 12 without reaching the recess 17. The sipes 18, for example, have lengths equal to or more than 50% of the width W1 in the tire axial direction of the block 12. At least one of the sipes 18 according to the present embodiment extends from the first surface 7. As a result, snow in the stair portion 9 can be discharged more effectively.

As illustrated in FIG. 4 and FIG. 5, the lateral grooves 4 according to the present embodiment is provided with tie-bars 19 where groove bottoms are raised. The tie-bars 19 can enhance stiffness of the blocks 12, resulting in improving wear resistance. In the present embodiment, each tie-bar 19 connects a respective pair of first block 12A and the second block 12B.

In the present embodiment, a distance L4 in the tire axial direction from each tie-bar 19 to the corner portion 12c of the second block 12B is preferably equal to or less than 50% of a length L5 in the tire axial direction of the lateral groove 4. Thus, it is possible to prevent reduction in stiffness of the blocks 12 provided with the stair portions 9. In the present embodiment, each tie-bar 19 is located on the narrow-width portion 4a. This further improves the above effects.

Although it is not particularly limited, a length Le of the tie-bars 19 is preferably in a range of 15% to 25% of the length L5 of the lateral groove 4. As shown in FIG. 4, a protruding height h1 from the groove bottom of each tie-bar 19 is preferably in a range of 5% to 50%, more preferably 15% to 40%, still further preferably 25% to 30% of a groove depth d2 of the lateral groove 4.

The circumferential groove 3 that defines the blocks 12 preferably has a groove depth d1 (shown in FIG. 4) of from 5 to 20 mm, for example. The lateral grooves 4 preferably have the groove depth d2 of 2.5 to 10 mm, and are preferably smaller than the groove depth d1 of the circumferential groove 3, for example.

Figure 7:
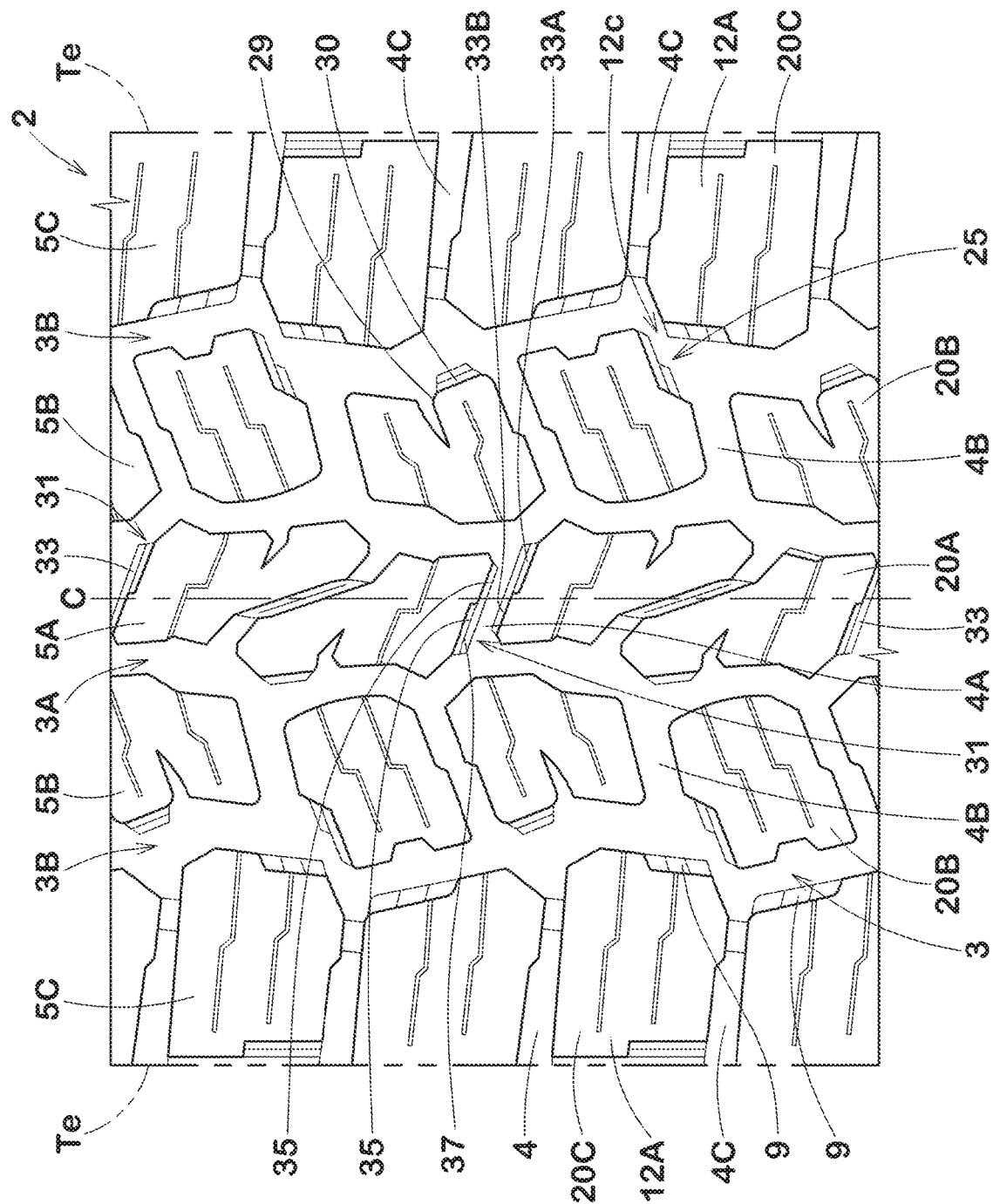
FIG. 7 is a plan view of the tread portion according to an embodiment.

FIG. 7 is a plan view of the tread portion 2 according to the present embodiment. As illustrated in FIG. 7, the tread portion 2 according to the present embodiment includes a crown land portion 5A, a pair of middle land portions 5B located outwardly in the tire axial direction of the crown land portion 5A, and a pair of shoulder land portions 5C located outwardly in the tire axial direction of the pair of middle land portions 5B. The crown land portion 5A, for example, is disposed on the tire equator C. The crown land portion 5A, the middle land portions 5B and the shoulder land portions 5C are defined by a plurality of circumferential grooves 3. The crown land portion 5A and the middle land portions 5B are defined by a pair of crown circumferential grooves 3A extending continuously in the tire circumferential direction. The middle land portions 5B and the shoulder land portions 5C are defined by a pair of shoulder circumferential grooves 3B extending continuously in the tire circumferential direction.

In the present embodiment, the crown land portion 5A, the middle land portions 5B and the shoulder land portions 5C are provided with the lateral grooves 4A, 4B and 4C to form crown blocks 20A, middle blocks 20B and shoulder blocks 20C, respectively. The crown land portion 5A is provided with a plurality of crown lateral grooves 4A extending between the pair of crown circumferential grooves 3A to form the crown blocks 20A. The pair of middle land portions 5B are provided with a plurality of middle lateral grooves 4B extending between the crown circumferential grooves 3A and the shoulder circumferential grooves 3B to form the middle blocks 20B. The pair of shoulder land portions 5C are provided with a plurality of shoulder lateral grooves 4C extending between the shoulder circumferential grooves 3B and tread edges Te to form the shoulder blocks 20C.

As used herein, the tread edges Te are defined as axially outermost edges of the ground contacting patch of the tread portion 2 which occurs under the normal condition with a standard tire load when the camber angle of the tire is zero.

As used herein, the standard tire load is a tire load officially approved for each tire by standards organizations in which the tire is based, wherein the standard tire load is the "maximum load capacity" in JATMA, the maximum value given in the above-mentioned table in TRA, the "Load Capacity" in ETRTO, for example.

In the present embodiment, one or more stair portions 9 are provided on one or more the shoulder blocks 20C. A large lateral force acts on the shoulder blocks 20C during cornering. By providing one or more stair portions 9 on one or more shoulder blocks 20C, steering stability on snowy roads can be improved. In order to effectively improve the above-mentioned effects, the stair portions 9, in the present embodiment, are provided on the shoulder blocks 20C. Note that the stair portions 9 are not limited to being provided on the shoulder blocks 20C, but may be provided on one or more crown blocks 20A and/or one or more middle blocks 20B, for example.

In the present embodiment, some of the middle lateral grooves 4B are located so as to face the stair portions 9 of the first blocks 12A. That is, the stair portions 9 are formed on tire axial direction lines passing through the middle lateral grooves 4B.

Figure 8:
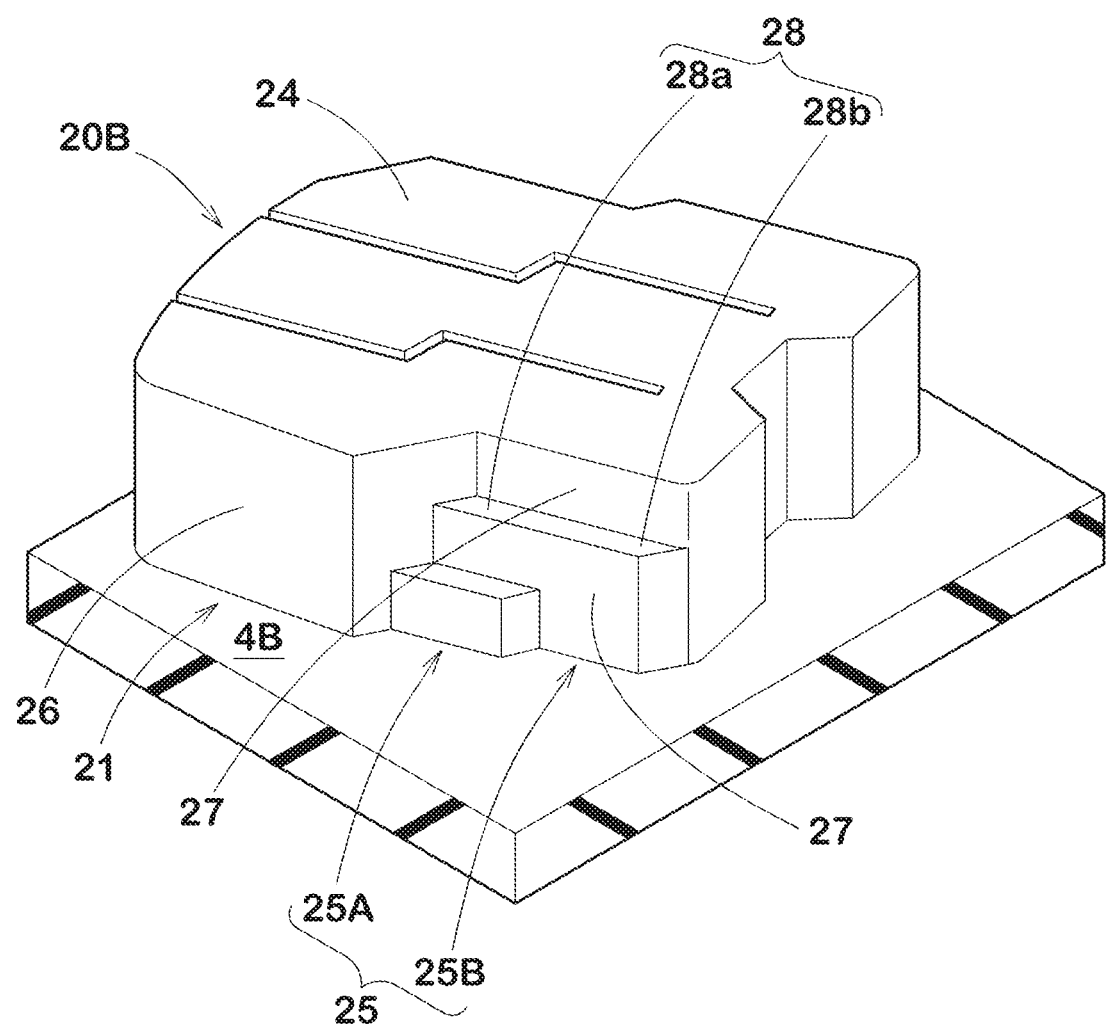
FIG. 8 is a perspective view of a middle block of FIG. 6.

FIG. 8 is a perspective view of one of the middle blocks 20B. As illustrated in FIG. 8, in the present embodiment, the middle block 20B includes a middle lateral sidewall 21 that faces one of the middle lateral grooves 4B. The middle lateral sidewall 21 includes a middle stair portion 25 varying its radial height stepwise from a ground contact surface 24 of the middle block 20B toward a groove centerline of the one of the middle lateral grooves 4B, and a slope portion 26 extending from the ground contact surface 24 to the groove bottom in a planer manner. The slope portion 26 helps to maintain stiffness of the middle block 20B.

The middle stair portion 25, in the present embodiment, includes a plurality of riser elements 27 extending in the tire radial direction and one or more step elements 28 extending between the riser elements 10. Each step element 28, for example, can firmly compress a snow column formed by the middle stair portion 25.

The middle stair portion 25, for example, includes a first portion 25A that includes a plurality of step elements 28 and a second portion 25B having a smaller number of step element(s) 28 than that of the first portion 25A. In the present embodiment, the first portion 25A has two step elements 28 with different heights in the tire radial direction, and the second portion 25B has one step element 28. Such a middle stair portion 25 can be helpful to form a firm snow column upon driving on snow.

A step element 28a arranged on the outermost of the first portion 25A in the tire radial direction and a step element 28b arranged on the outermost of the second portion 25B in the tire radial direction have the same height in the tire radial direction. Thus, stiffness of the middle stair portion 25 is maintained high, and deterioration of wear resistance of the middle block 20B can be prevented.

As illustrated in FIG. 7, the middle stair portion 25, in the present embodiment, is located so as to face the corner portion 12c of one of the first blocks 12A. In the present embodiment, the middle stair portion 25 is arranged on a position to overlap in the tire circumferential direction with the stair portion 9 of the one of the first blocks 12A. This can form a large snow column that bridges the stair portion 9 and the middle stair portion 25, which improves driving performance on snow.

In the present embodiment, the middle blocks 20B, on each side of the tire equator C, includes middle longitudinal sidewalls 29 that face the shoulder circumferential groove 3B. The middle longitudinal sidewalls 29 of some of the middle blocks 20B, for example, include middle longitudinal stair portions 30 that vary its radial height stepwise toward the groove centerline of the shoulder circumferential groove 3B. The middle longitudinal stair portions 30, for example, descend toward the groove centerline of the shoulder circumferential groove 3B. Each middle longitudinal stair portion 30, in the present embodiment, is provided on a tire axial line that passes within a respective one of the shoulder lateral grooves 4C.

The crown blocks 20A, in the present embodiment, include crown lateral sidewalls 31 that face the crown lateral grooves 4A. The crown lateral sidewalls 31 of some of the crown blocks 20A, for example, are provided with crown stair portions 33 that descend its radial height stepwise toward the groove centerlines of the crown lateral grooves 4A. Each crown stair portion 33, in the present embodiment is provided over the entire length of the crown lateral sidewall 31 in the tire axial direction.

Each crown stair portion 33, for example, includes a plurality of riser elements 35 extending in the tire radial direction and one or more step elements 37 extending between the riser elements 35. The step elements 37, for example, can firmly compress a snow column formed by the crown stair portion 33, resulting in generating powerful snow traction.

Each crown stair portion 33, for example, includes a first portion 33A having a plurality of step elements 37, and a second portion 33B having a smaller number of step elements 37 than that of the first portion 33A. In the present embodiment, the first portion 33A has two step elements 37 with different heights in the tire radial direction. In the present embodiment, the second portion 33B has a single step element 37. Such a crown stair portion 33 can be helpful to form a firm snow column upon driving on snow.

In the present embodiment, the stair portions 9 are provided on blocks 20. The stair portions 9 are not limited to those provided on the blocks 20, but may be provided on a ribbed land portion 5 where lateral grooves 4 that traverse the land portion 5 completely are not provided, for example.

Figure 9:
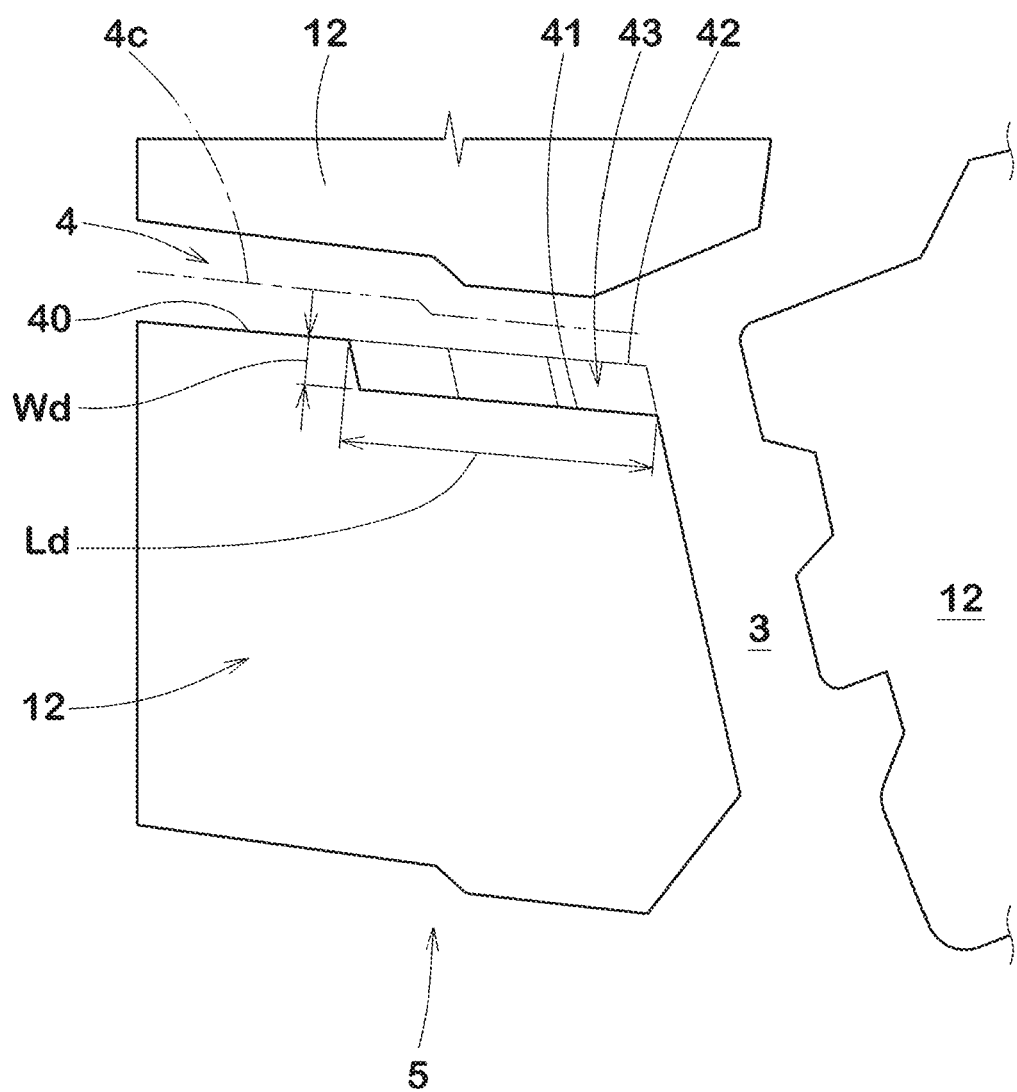
FIG. 9 is a plan view of a land portion according to another embodiment.

FIG. 9 is a plan view of the land portion 5 according to another embodiment. In the present embodiment, the same components as the components are given the same reference numerals and detailed explanations are omitted. As illustrated in FIG. 9, the land portion 5 is divided by one or more lateral grooves 4 into a plurality of blocks 12. The blocks 12, for example, include land sidewall 40 facing the lateral grooves 4.

One of the land sidewalls 40, in this embodiment, includes a first surface 41, a second surface 42 located on a groove centerline 4c side of one of the lateral grooves 4 with respect to the first surface 41, and a stair portion 43 formed between the first surface 41 and the second surface 42. The stair portion 43 varies its radial height stepwise in two or more steps in a longitudinal direction of the lateral groove 4. Such a stair portion 43 can generate powerful snow traction in the longitudinal direction of the lateral groove 4 when traveling on a snowy road. Thus, the tire 1 of this embodiment also has excellent driving performance on snow.

In this embodiment, a length Ld of the stair portion 43 is greater than a width Wd of the stair portion 43. As used herein, the length Ld of the stair portion 43 is a distance between both ends in the direction in which the height changes (in the present embodiment, the longitudinal direction of the lateral groove 4). Further, the width Wd of the stair portion 43 is a length orthogonal to the longitudinal direction of the stair portion 43. The length Ld of the stair portion 43, for example, is preferably 2 to 8 times the width Wd of the stair portion 43. This allows the stair portion 43 to form a relatively large snow column in the tire axial direction.

While the particularly preferred embodiments in accordance with the disclosure have been described in detail above, the present disclosure is not limited to the above embodiments but can be modified and carried out in various aspects within the scope of the disclosure.

Example

Tires with the basic pattern of FIG. 7 were prototyped based on the specifications in Table 1. Then, driving performance on snow and wear resistance were tested for each test tire. The test method and common specifications are as follows.

Tire size: 35×12.50R20LT
Rim size: 20×10J
Inner pressure: 260 kPa

Test for Driving Performance on Snow:

Test tires were installed on all wheels of a 4600 cc pickup truck. Then, a test driver drove the vehicle on a snowy road, and traction, braking performance and stability at that time were evaluated by the sensuality of the test driver. The test results are indicated with a score of 100 for Ref. 1, and the larger the value, the better the driving performance on snow.

Test for Wear Resistance:

A test driver drove the above vehicle on a dry asphalt road surface for 20,000 km. Then, the degree of wear of the shoulder blocks and the occurrence of uneven wear were evaluated by a checker. The test results are indicated with a score of 100 in Ref. 1. The larger the value, the more the occurrence of wear and uneven wear is suppressed, and the better the wear resistance performance.

The test results are shown in Table 1. Note that "Width" in Table 1 means the width direction of the circumferential groove, and "longitudinal" means the longitudinal direction of the circumferential groove.

TABLE 1

|  | Ref. 1 | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Direction of stair portions | Width | longitudinal | longitudinal | longitudinal | longitudinal | longitudinal | longitudinal | longitudinal | longitudinal | longitudinal |
| Number of steps of each stair portion | 3 | 3 | 2 | 5 | 3 | 3 | 3 | 3 | 3 | 3 |
| Descending directions of stair portions on first and second blocks | — | reverse | reverse | reverse | the same | reverse | reverse | reverse | reverse | reverse |
| La/L1 (%) | 50 | 50 | 50 | 50 | 50 | 10 | 100 | 50 | 50 | 50 |
| Wa/W1 (%) | 10 | 10 | 10 | 10 | 10 | 10 | 10 | 50 | 30 | 10 |
| Tie-bars | presence | presence | presence | presence | presence | presence | presence | presence | presence | none |
| Driving performance on snow [score: larger is better.] | 100 | 120 | 115 | 115 | 115 | 110 | 125 | 125 | 120 | 120 |
| Wear resistance [score: larger is better.] | 100 | 110 | 112 | 105 | 110 | 115 | 100 | 102 | 105 | 105 |

As the test results, it is confirmed that the tires of the example were superior to the tire of the comparative example in driving performance on snow. In addition, it is also confirmed that the tires of the example maintain wear resistance performance.

What is claimed is:

1. A tire comprising:
a tread portion comprising a circumferential groove and a land portion defined by the circumferential groove, the land portion comprising a land sidewall facing the circumferential groove,
the land sidewall comprising a first surface, a second surface located on a groove centerline side of the circumferential groove with respect to the first surface, and a stair portion formed between the first surface and the second surface, wherein
the stair portion varies its radial height stepwise in two or more steps in a longitudinal direction of the circumferential groove,
the land portion comprises a plurality of circumferentially arranged blocks divided by lateral grooves,
the plurality of blocks comprising a first block and a second block which are adjacent in a tire circumferential direction of the tire through one of the lateral grooves,
the stair portion is provided on an inner side of the first block and on an inner side of the second block in the tire axial direction,
the stair portion provided on the first block descends toward the one of the lateral grooves, and
the stair portion provided on the second block descends toward the one of the lateral grooves.

2. The tire according claim 1, wherein the stair portion communicates with one of the lateral grooves.

3. The tire according claim 1, wherein
the at least one of the plurality of blocks provided with the stair portion comprises a corner portion formed between the circumferential groove and one of the lateral grooves, and the corner portion is provided with a recess formed by the first surface, the second surface and the stair portion.

4. The tire according claim 1, wherein
a length of the stair portion is equal to or less than 80% of a length in a tire circumferential direction of the at least one of the plurality of blocks.

5. The tire according claim 1, wherein
a width of the stair portion is equal to or less than 30% of a width in a tire axial direction of the at least one of the plurality of blocks.

6. The tire according to claim 1, wherein
the stair portion varies its radial height stepwise in three or more steps in the longitudinal direction of the circumferential groove.

7. The tire according to claim 1, wherein
the stair portion provided on the first block or the stair portion provided on the second block communicates with the one of the lateral grooves.

8. The tire according to claim 7, wherein
in a plan view of the tread portion, the stair portion provided on the first block is located so as not to overlap the stair portion provided on the second block in a tire axial direction.

9. The tire according to claim 8, wherein
the land sidewall of the first block comprises a third surface opposite to the first surface in a tire axial direction,
the third surface is provided with a recess configured as a stair portion that descends in steps in the tire axial direction away from the circumferential groove.

10. The tire according to claim 8, wherein
in a plan view of the tread portion, the stair portion provided on the first block has a longitudinal direction inclined in a first direction with respect to the tire circumferential direction, and the stair portion provided on the second block has a longitudinal direction inclined in a second direction opposite to the first direction with respect to the tire circumferential direction.

11. The tire according to claim 7, wherein
in a plan view of the tread portion, the stair portion provided on the first block has a longitudinal direction inclined in a first direction with respect to the tire circumferential direction, and the stair portion provided on the second block has a longitudinal direction inclined in a second direction opposite to the first direction with respect to the tire circumferential direction.

12. The tire according to claim 7, wherein
the stair portion comprises a plurality of riser elements extending in a tire radial direction and a plurality of step elements extending between the riser elements, and
a number of step elements is three or more.

13. The tire according to claim 7, wherein
the land sidewall of the first block comprises a third surface opposite to the first surface in a tire axial direction,
the third surface is provided with a recess configured as a stair portion that descends in steps in the tire axial direction away from the circumferential groove.

14. The tire according to claim 13, wherein
the recess is arranged so as to overlap the stair portion provided on the first block in the tire circumferential direction at least partially.

15. A tire comprising:
a tread portion comprising a circumferential groove and a land portion defined by the circumferential groove, the land portion comprising a land sidewall facing the circumferential groove, the land sidewall comprising a first surface, a second surface located on a groove centerline side of the circumferential groove with respect to the first surface, and a stair portion formed between the first surface and the second surface, wherein the stair portion varies its radial height stepwise in two or more steps in a longitudinal direction of the circumferential groove, the land portion comprises a plurality of circumferentially arranged blocks divided by lateral grooves, the plurality of blocks comprising a first block and a second block which are adjacent in a tire circumferential direction of the tire through one of the lateral grooves, the land sidewall of the first block further comprises a third surface opposite to the first surface in a tire axial direction, and the third surface is provided with a recess configured as a stair portion that descends in steps in the tire axial direction away from the circumferential groove.

* * * * *